United States Patent [19]

Sebille

[11] Patent Number: 4,690,627
[45] Date of Patent: Sep. 1, 1987

[54] ROTARY EXTRUSION HEAD MORE ESPECIALLY FOR MANUFACTURING CABLES WITH HELICAL GROOVES FOR OPTICAL FIBERS

[75] Inventor: Michel Sebille, Carrieres-Sur-Seine, France

[73] Assignee: Treficable Pirelli, Saint Maurice, France

[21] Appl. No.: 800,517

[22] Filed: Nov. 21, 1985

[30] Foreign Application Priority Data

Nov. 21, 1984 [FR] France .................. 84 17735

[51] Int. Cl.$^4$ ............................ B29C 47/06
[52] U.S. Cl. .................. 425/113; 425/122; 425/376 B; 425/461
[58] Field of Search ............ 425/113, 122, 461, 131.1, 425/376 B, 461

[56] References Cited

U.S. PATENT DOCUMENTS

| 466,910 | 1/1892 | Boyle et al. | 425/113 |
|---|---|---|---|
| 3,566,753 | 3/1971 | Mantke | 425/113 |
| 4,111,621 | 9/1978 | Otani | 425/113 |
| 4,365,946 | 12/1982 | Anders | 425/461 |
| 4,395,869 | 8/1983 | Priaroggia et al. | 156/51 |
| 4,528,148 | 7/1985 | Dotti | 425/392 |
| 4,548,567 | 10/1985 | Missout | 425/113 |
| 4,620,412 | 11/1986 | Portinari | 57/6 |
| 4,623,495 | 11/1986 | Degoix et al. | 425/113 |

Primary Examiner—Willard E. Hoag
Attorney, Agent, or Firm—Brooks Haidt Haffner & Delahunty

[57] ABSTRACT

The invention provides a rotary extrusion head comprising a head body having a sole piece and in which are formed a cylindrical through bore and a duct for supplying the material to be extruded, which extends between the sole piece and the cylindrical bore.

According to the invention, this extrusion head further comprises a mandrel mounted for rotation in the cylindrical bore, a die holder fixed to a first end of the mandrel and a pinion or a pulley fixed to the second end of the mandrel, the die holder being held against the head body by means immobilizing the mandrel in translation which are mounted on the same side as the second end of the mandrel and which bear on the head body, the mandrel, the die holder and the immobilization means being bored axially.

6 Claims, 1 Drawing Figure

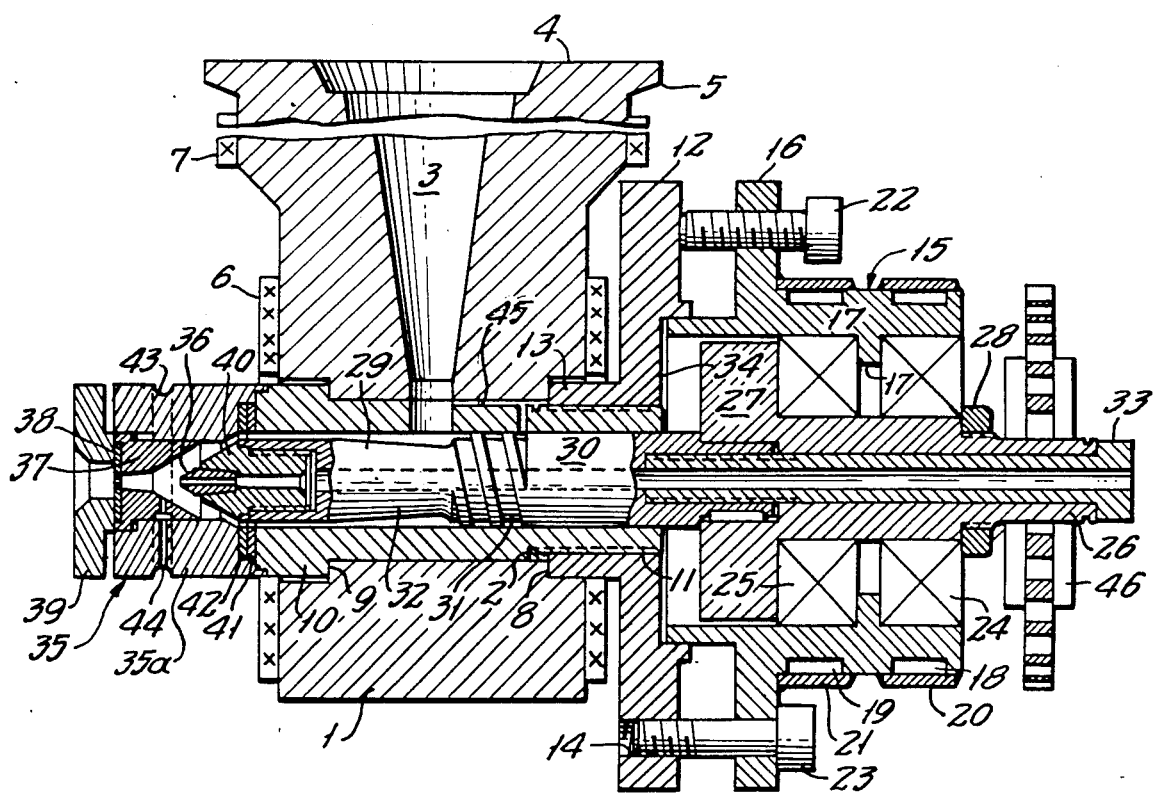

ROTARY EXTRUSION HEAD MORE ESPECIALLY FOR MANUFACTURING CABLES WITH HELICAL GROOVES FOR OPTICAL FIBERS

The present invention relates to a rotary extrusion head, more particularly for manufacturing cables with helical grooves for optical fibers.

BACKGROUND OF THE INVENTION

In the cable making industry, extruders are used for forming a sheath or casing of plastic material about a cable core, more particularly made from metal. These extruders comprise an extrusion head disposed at right angles with respect to the axis of the hopper which supplies this head with material to be extruded, the head having passing longitudinally therethrough the core of the cable to be covered and having at one of its ends a die for obtaining the desired sheath profile.

In some cases, the die is mounted for rotation with respect to the extrusion head, more especially for manufacturing cables with helical grooves intended to receive optical fibers. Usually, the die is driven from a mechanism disposed in the immediate vicinity of this die.

This arrangement has a number of drawbacks. It does not allow the operator to readily fit or remove the die, since the drive mechanism limits access thereto. It is not possible to heat the die, since the drive mechanism is not, a priori, capable of supporting over heating: it follows then that the plastic materials which may be extruded are limited to those with a low melting point. Furthermore, it is difficult to provide and control the seal between the rotating die and the fixed body of the extrusion head, because of the high pressures of the plastic material upstream of the die.

Therefore, one of the aims of the present invention is to provide a rotary extrusion head, more especially for manufacturing cables with helical grooves for optical fibers, which allows ready access to the die and which may be heated if required.

Another aim of the invention is to provide an extrusion head allowing the mechanical part driving the die to be cooled without affecting the temperature of the product being extruded.

SUMMARY OF THE INVENTION

These aims as well as others which will appear further on are attained by means of a rotary extrusion head, more especially for manufacturing cables with helical grooves for optical fibers, comprising a head body having a sole piece or base and in which are formed a cylindrical through-bore and a duct for supplying the material to be extruded, which extends between the sole piece and the cylindrical bore. According to the invention, this extrusion head further comprises a mandrel mounted for rotation in the cylindrical bore, a die-holder fixed to a first end of the mandrel and a pinion or pulley fixed to the second end of the mandrel, the die holder being held against the head body by means immobilizing the mandrel against translation which are mounted on the same side as the second end of the mandrel and which bear on the head body, the mandrel, the die holder and the immobilization means being bored axially.

Thus, in accordance with the invention, the means for driving the die holder are removed to a distance therefrom, i.e. from the hot zone of the die head. Thus, on the one hand the die holder may be considerably heated without prejudice for the drive means which are not, a priori, provided for operating at high temperatures and, on the other hand, these drive means may even be cooled. In addition, accessibility to the die holder is improved and allows simple fitting of the die and of possible auxiliary extruders without danger for the operator.

The extrusion head thus obtained is substantially more compact than those of the prior art, in which the drive mechanism cooperates directly with the die holder which is already bulky in itself.

Moreover, the simultaneous rotation of the mandrel and of the die holder eliminates the shearing of the molecular chains of the plastic materials, which appears at the junction between fixed mandrel and mobile die holder, in known extrusion heads; up to now such a phenomenon has limited the number of plastic materials which may be used.

Preferably, the mandrel comprises, upstream of the supply duct, a portion having a carrier profile in the form of an endless screw which is connected to this duct by a channel. Thus the material to be extruded is used as lubricant for promoting rotation of the mandrel in the head body.

Advantageously, the rotary die holder bears on the front face of the head body through two juxtaposed metal sealing rings.

In a preferred embodiment of the invention, the means for immobilizing the mandrel against translation comprise at least one bearing which is supported, secured against translation, by the mandrel between the head body and the pinion, and which is mounted in a case, this case being adjustably immobilized against translation with respect to the head body by means of screws.

Advantageously, the mandrel is mounted in the cylindrical bore of the head body through a sleeve fixedly mounted in this cylindrical bore, and the end of the sleeve situated opposite the case has a flange with which the screws for immobilizing the case cooperate.

The extrusion head of the invention may comprise the following improvements:

the bearing and the pinion are carried by a shaft fixed in the extension of the second end of the mandrel;

the case is provided with peripheral cavities for the flow of a cooling fluid;

finally, the die holder has peripheral annular channels opening through radial channels inside the die holder.

BRIEF DESCRIPTION OF THE DRAWING

The following description, which has non limitative character, should be read with reference to the single FIGURE showing, in elevation and essentially in section, a rotary extrusion head in accordance with the invention.

DESCRIPTION OF THE PREFERRED EMBODIMENT

The extrusion head shown in this FIGURE comprises a solid and generally cylindrical head body 1 in which are formed, on the one hand, a cylindrical bore 2 which passes through the head body 1 perpendicularly to its axis and, on the other hand, an axial conical duct 3 which extends from the cylindrical bore 2 while widening out as far as one of the front faces 4 of the head body 1. This front face 4 is provided with a collar 5 for fixing the head body 1 to the outlet of an extruder. The outer diameter of the head body 1 is increased in the vicinity of the front face 4 into which the conical duct 3 opens. The cylindrical bore 2 has, in the vicinity of its ends, two shoulders 8, 9. Two cylindrical casings 6, 7 cover the greatest part of the outer surface of the head body 1; in these casings electric resistances are embedded for heating the head body 1, in a way known per se.

A hollow cylindrical sleeve 10 is mounted without play in the cylindrical bore 2 of the head body 1 while projecting from this bore on each side. Sleeve 10 has a shoulder in the vicinity of one of its ends for bearing on one of the shoulders, shoulder 9 in the present embodiment, of the cylindrical bore 2. The other end of sleeve 10 has a threaded portion 11.

A flange 12 in the form of a disk has a circular opening at its center, from which extends an inner threaded cylinder portion 13. Flange 12 also has tapped holes 14 spaced apart at its periphery and a central cup 34 on the side opposite the cylinder 13.

The tapped cylinder 13 is screwed onto the threaded end of sleeve 10 and comes into abutment against the corresponding shoulder 8 of the head body 1; flange 12 and sleeve 10 are thus fixed in translation with respect to the head body 1.

The extrusion head further comprises a case 15 in the general form of a hollow cylinder having an outer peripheral collar 16 with through holes, as well as a circular inner rib 17. In addition, circular peripheral grooves 18, 19 are formed in the outer surface of case 15; they are closed by rings 20 and 21 welded to case 15 so as to form cavities intended to receive a cooling fluid, if required.

Case 15 is adjustably fixed to flange 12 of the extrusion head with interposition of spacer screws 22 which are screwed into collar 16 of the case and come to bear on flange 12 and by means of clamping screws 23 which pass freely through the collar 16 and which are screwed into the tapped holes 14 of flange 12. The end of the case cylinder is housed in the cup 34 of flange 12.

Two bearings 24, 25 bear on each side of the inner rib 17 of case 15. These bearings are carried by a hollow shaft 26 one end of which comprises a collar 27 which bears against bearing 25 disposed opposite flange 12 of the extrusion head and the other end of which has a nut 28 which bears against the other bearing 24 as well as a pinion 46 intended to be connected to a motor.

The extrusion head comprises a mandrel 29 which has a cylindrical portion 30 adjustable at the inside of sleeve 10, a portion 31 also adjustable and having a carrier profile in the form of an endless screw, and a conical portion 32, of a diameter less than the inner diameter of the sleeve, opening out slightly from the preceding portion towards the corresponding end of sleeve 10. The end of the cylindrical portion 30 penetrates into the hollow shaft 26 and it comprises at this level a stepped face by which it bears on collar 27 of this shaft; it is interlocked in rotation with this shaft by keying and in translation by means of a screw 33 which passes axially through the hollow shaft 26 and cooperates with a corresponding tapping in mandrel 29.

The conical portion 32 of mandrel 29 receives at its free end a die holder 35 which comprises, in a way known per se, a male member 36 and a female member 37, a die 38 and a nut 39. The die holder 35 is formed by a hollow cylinder 35a from one end of which a central core 40 of smaller diameter extends and which the die holder 35 is screwed into a corresponding tapping in mandrel 29 so that the die holder 35 rotates with the mandrel 29, the material to be extruded flowing through channels formed between the cylinder 10 and the core 40. The male member 36 is carried by core 40 and the female member 37 is carried directly by the cylinder 35a of the die holder 35, these members defining a cone bringing the material to be extruded to the die 38, the male member 36 also serving for guiding a cable core passing through the assembly of the extrusion head. The die 38 is formed from a disk perforated at its center with a desired pattern, bears on the female member 37 and is fixed by nut 39.

The rotatable die holder 35 bears, on the front face of the axially fixed sleeve 10, through two juxtaposed metal sealing rings 41, 42, which are clamped by the spacer screws 22. The outer surface of the die holder 35 comprises an annular channel 43 connected by a radial channel 44 to the inner cavity of the die holder 35; with this arrangement an auxiliary extruder may be mounted, if need be, on the die holder 35 for marking by coloring the material to be extruded.

The portion 31 with an endless screw profile is disposed axially on mandrel 27 so that, when the sleeve 10 is in abutment with the head body 1, it is upstream of the supply duct 3 with respect to the flow of the material to be extruded, i.e. between the emerging opening of this duct 3 and the cylindrical portion 30 of mandrel 29.

Sleeve 10 is provided with a channel 45 which comprises a peripheral segment parallel to its axis and a radial segment, and which allows duct 3 of head body 1 to be placed in communication with the upstream zone of the portion 31 of mandrel 29 provided with the endless screw profile, said profile moving downstream, i.e. towards the die, the material to be extruded coming from channel 45. This guide profile of the rotary mandrel 29 within the axially fixed sleeve 10 is therefore lubricated by the material to be extruded.

Finally, the screw 33 for axially fixing mandrel 29, this mandrel and the die holder 35 as a whole are axially bored to allow the passage of a cable core to be covered with a material to be extruded.

It will be noted that the die holder 35 is very accessible, more especially for removing it but also for heating it by means, for example, of a thermally regulated hot air generator.

The embodiments of the invention in whch an exclusive property or privilege is claimed are defined as follows:

1. An extrusion head for applying a layer of a material to a core as it is advanced, said extrusion head comprising:
    a head body having mandrel receiving bore extending therethrough and a duct extending transversely to said bore for supplying said material to said bore;
    a mandrel rotatably and axially movably mounted in said bore, said mandrel having a downstream end and an upstream end and a screw threaded portion intermediate said upstream end and said downstream end and within said bore for advancing said material within said bore in the direction of said downstream end with rotation of said mandrel and said mandrel having an axial passageway therein for the passage of said core therethrough;
    a die assembly secured to said mandrel at said downstream end thereof for rotation therewith, said assembly comprising a hollow cylindrical member carrying a die with an opening aligned with said passageway in said mandrel and said cylindrical member being restrained with respect to movement in the direction from said downstream end to said upstream end of said mandrel by said body;

adjusting means rotatably engaging said upstream end of said mandrel and acting between said upstream end of said mandrel and said body for adjusting the axial position of said mandrel within said bore; and driving means at the upstream end of said mandrel and engaging the upstream end of said mandrel for rotating said mandrel.

2. An extrusion head as set forth in claim 1 further comprising at least one sealing ring intermediate said cylindrical member and said body for sealing said cylindrical member with respect to said body to prevent the passage of said material between said body and said cylindrical member.

3. An extrusion head as set forth in claim 1 wherein said driving means comprises a hollow shaft secured to said upstream end of said mandrel for rotation therewith; said hollow shaft having a free end remote from said upstream end of said mandrel and said adjusting means comprises at least one bearing engaging to said shaft so that said shaft, and hence, said mandrel, is axially movable with said bearing, an axially movable casing around said bearing, said casing having means engaging said bearing for causing said bearing to move axially with said casing, and adjustable means interconnecting said casing and said body for adjusting the axial position of said casing with respect to said body.

4. An extrusion head as set forth in claim 3 wherein said bore is surrounded by a sleeve fixed in axial position with respect to said body and further comprising a flange secured to said sleeve at the upstream end of said mandrel and wherein said adjustable means interconnects said casing and said flange.

5. An extrusion head as set forth in claim 3 wherein said casing has at least one channel therein for the flow of cooling fluid.

6. An extrusion head as set forth in claim 1 wherein said hollow cylindrical member has a peripheral channel with radial channels extending from said peripheral channel to the interior of said hollow cylindrical member for the supply of further material to the interior of said hollow cylindrical member and applying such further material around said core as it is advanced through said cylindrical member.

* * * * *